Nov. 5, 1968 V. E. BENES 3,409,835

FEEDBACK DEMODULATION EMPLOYING POWER-LAW SIGNAL CONVERTER

Filed Nov. 6, 1964 2 Sheets-Sheet 1

INVENTOR
V. E. BENES
BY G. E. Kersey
ATTORNEY

United States Patent Office 3,409,835
Patented Nov. 5, 1968

3,409,835
FEEDBACK DEMODULATION EMPLOYING POWER-LAW SIGNAL CONVERTER

Vaclav E. Benes, Chester, N.J., assignor to Bell Telephone Laboratories, Incorporated, New York, N.Y., a corporation of New York Filed Nov. 6, 1964, Ser. No. 409,386
10 Claims. (Cl. 325—351)

ABSTRACT OF THE DISCLOSURE

An FM feedback demodulator for reducing the deviation of an angle modulated wave is constructed with a selected power-law signal converter and an adder in place of the conventional harmonic oscillator and mixer.

This invention relates to feedback demodulation and, more particularly, to the feedback demodulation of angle modulated waves.

In angle modulation, the amplitude of a modulating signal determines the angular deviation of the modulated wave. As the deviation increases, the effect of noise on information recovered by demodulation would increase correspondingly, were it not for the introduction of feedback.

Conventional feedback demodulation employs a feedback loop that includes a harmonic oscillator and a mixer. The mixer derives a wave of reduced angular deviation from the output of the harmonic oscillator and the modulator input. The oscillator typically requires stabilization to prevent drift that would otherwise interfere with the proper operation of the mixer.

Accordingly, it is an object of the invention to reduce the deviation of an angle modulated wave. A related object is to do so without the need for a harmonic oscillator. A still further object is to achieve the benefit of feedback demodulation without the use of a mixer.

In accomplishing the foregoing and related objects the invention provides for the inclusion of a nonlinear signal converter in the loop of a feedback demodulator. The signal converter has a "power-law" characteristic in the sense that the relationship between the input and the output of the device can be described in terms of one or more variable quantities, each of which is raised to a power which can be greater than or less than unity. In the simple case, the output of the device is the input of the device raised to a power which can be greater than or less than unity. The converter transforms a complex wave, having a plurality of carrier frequency constituents, into a simple wave having a single carrier frequency constituent.

The output of the nonlinear device is linearly combined with an incoming modulated wave at the input of the feedback loop to derive, by way of an intermediate frequency filter, an outgoing wave of reduced modulation index. The filter, of bandwidth appropriate to accommodate the modulating signal of the modulated wave, serves to reduce the wideband noise that would otherwise accompany the outgoing wave, and selects a signal of appropriate frequency for the feedback path.

The ultimate effect of the nonlinear device in the feedback loop is to produce a subharmonic of the incoming modulated wave. When the device is placed in the forward path of the loop, it typically has a power of less than unity; but in the return, i.e., feedback, path of the loop, the power is typically greater than unity.

In a representative embodiment of the invention, the nonlinear device is included in the forward path of the feedback loop and takes the form of a cube rooter, i.e., the power of the device is one-third and the index of modulation of the incoming wave is reduced by a factor of three.

Other aspects of the invention will be evident after consideration of an illustrative embodiment taken in conjunction with the drawings in which.

Figure 1:
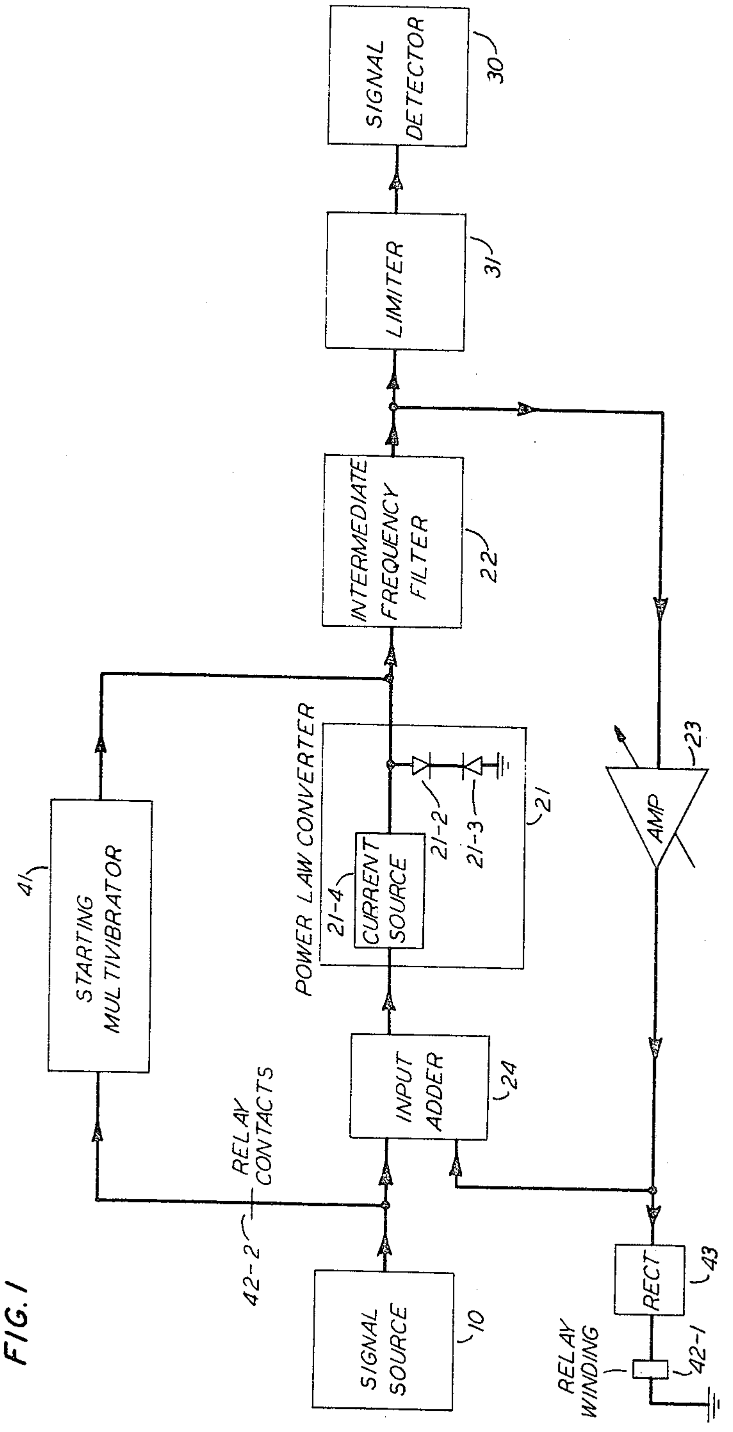
FIG. 1 is a block diagram of a feedback demodulation system employing a power-law signal converter in the forward path of a feedback loop.

With reference to FIG. 1, a feedback demodulation system in accordance with the invention includes a feedback loop that is interposed between a signal source 10 and a signal detector 30. The constituents of the loop serve to transform an incoming angle modulated wave from the source 10 into an outgoing angle modulated wave of reduced deviation. Hence the recovery of the modulating signal by the detector 30 is less susceptible to the effects of noise.

Constituting the loop are a forward path that includes a power-law signal converter 21 and an intermediate frequency filter 22, and a return path that includes an amplifier 23. At the input to the loop is an adder 24 which combines the incoming wave from the source with a portion of the outgoing wave that is present on the return path. The extent of the latter is controlled by the gain setting of the amplifier 23.

In effect the input adder 24 produces a composite wave which can be represented by a trigonometric series. The composite wave is acted upon by the power-law converter 21 to derive an outgoing wave containing the original modulating information, but having a reduced angular deviation. Consequently the reduction in angular deviation is accomplished without the need for either an input mixer or a harmonic oscillator.

When the power-law converter 21 is included in the forward path as shown in FIG. 1, it has an integral power-law characteristic of the sort that is readily provided by a function generator. Representative function generators are discussed by Karplus and Soroka in Analog Methods, 2nd edition, McGraw-Hill, New York, 1959. Other suitable power-law converters are provided by apparatus of the type disclosed by G. F. Rogers in Patent 2,876,349, issued Mar. 3, 1959.

For the purpose of illustrating the invention, it will be assumed that an incoming frejuency modulated wave represented trigonometrically as $\cos 3\theta$ is to have its modulation index reduced by a factor of 3—so that the outgoing wave is represented trigonometrically as $\cos \theta$. In that event the power-law converter has a cube root characteristic. Such an characteristic can be approximated by two junction-type diodes 21–2 and 21–3 which are connected back to back and fed from a current source 21–4. The diodes are selected to have a characteristic that rises sharply beyond the origin. When such diodes are energized from a current source, the voltage developed across their terminals approximates the cube root of the applied current. Where the input adder 24 itself acts as a current source, the converter current source 21–4 is not required.

When the illustrative modulated wave represented by $\cos 3\theta$ is applied to the input adder 24, it is linearly combined with the signal on the return path.

For a return signal that is proportional to $3 \cos \theta$, the input to the nonlinear signal converter becomes:

$$\cos 3\theta + 3 \cos \theta \quad (1)$$

Trigonometrically, the input of expression (1) can be expressed in terms of the identity:

$$\cos 3\theta + 3 \cos \theta = 4 \cos^3 \theta \quad (2)$$

Consequently, the output of the converter, which is the cube root of identity (2), is substantially $4^{1/3} \cos \theta$. This output is passed through the intermediate frequency filter 22, which is tuned accordingly, and then to the detector 30, which is of conventional design, by way of a limiter 31. The bandwidth of the filter 22 is proportioned to accommodate the modulating signal of the outgoing modulated wave.

The filter 22 also serves to reduce the wideband noise that passes through the power-law converter 21 despite the fact that the output of the converter is of reduced modulation index. Noise effects are reduced further by the action of the limiter 31 in eliminating amplitude variations from the outgoing wave.

In order to satisfy identity (2) the feedback signal is proportional to $3 \cos \theta$. The output of the converter, howis $4^{1/3} \cos \theta$. Hence a feedback signal of appropriate magnitude for combination with the incoming wave is produced by having a gain setting of approximately $3 \cdot 4^{1/3}$ for the amplifier 23 of the return path.

It has been assumed that an appropriate return signal is available on the feedback path at starting. Under ordinary circumstances, this will be the case because of noise voltages that are generated in the feedback loop, and a signal constituent of appropriate frequency will be passed by the filter 22 to the feedback path. Thus the filter serves the additional function of helping to provide a starting signal.

However, to facilitate starting, the invention provides a starting multivibrator 41 whose operation is controlled by a relay 42–1 with respect to a rectifier 43 that is connected to the feedback path. The multivibrator has a time constant which is three times the period of the incoming modulated wave. When the wave is first applied to the system, a portion of its energy passes to the multivibrator 41 through normally closed contacts 42–2 of the relay 42–1. This produces a multivibrator transient of suitable frequency at the intermediate frequency filter 22. Once the system has started, the multivibrator 41 is no longer required and it is disengaged by energizing the relay 42–1 through the rectifier 43 in order to open the normally closed relay contacts 42–2.

Figure 2:
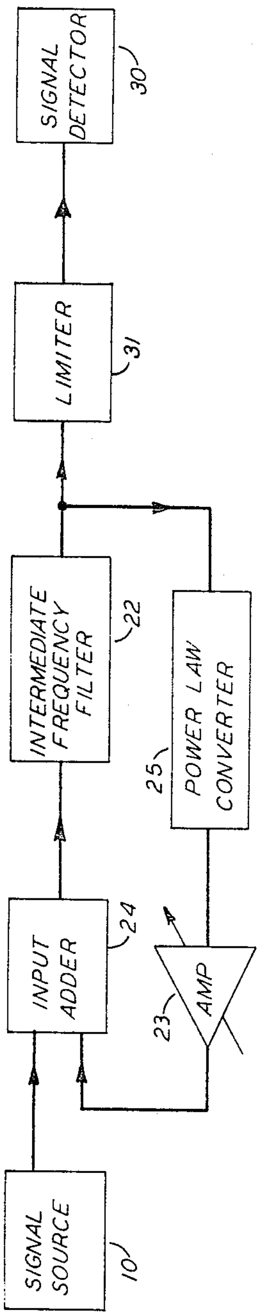
FIG. 2 is a block diagram of a feedback demodulation system employing a power-law signal converter in the feedback path of a feedback loop.

An alternative embodiment of the invention is set forth in FIG. 2. In this embodiment a power-law converter 25 is included in the return path of the feedback loop. By contrast with the converter 21 of FIG. 1, the converter 25 of FIG. 2 has an integral, rather than fractional, power characteristic. Such a characteristic is readily realized using a function generator, as discussed earlier.

Continuing the earlier example, in which the deviation of an angle modulated wave is reduced by a factor of 3, the incoming wave is represented trigonometrically as $\cos 3\theta$ and the outgoing wave is $\cos \theta$. In such a case, the converter 25 has a cube, i.e., third power, characteristic.

If the input to the converter 25 is $-3 \cos \theta$, the output, because of the third power characteristic of the converter, is $-27 \cos^3 \theta$. In addition, if the amplifier 23 has a gain setting of $4/27$, the return signal applied to the input adder 24 of FIG. 2 will be $-4 \cos \theta$ so that the output of the adder becomes:

$$\cos 3\theta - 4 \cos^3 \theta \quad (3)$$

But, as seen by transposing Equation 2, expression (3) is a part of the identity:

$$\cos 3\theta - 4 \cos^3 \theta = -3 \cos \theta \quad (4)$$

Hence, the output of the intermediate frequency fiter 22 in FIG. 2 is an outgoing wave that is suitable for the return path and is of reduced angular deviation.

Figure 3:
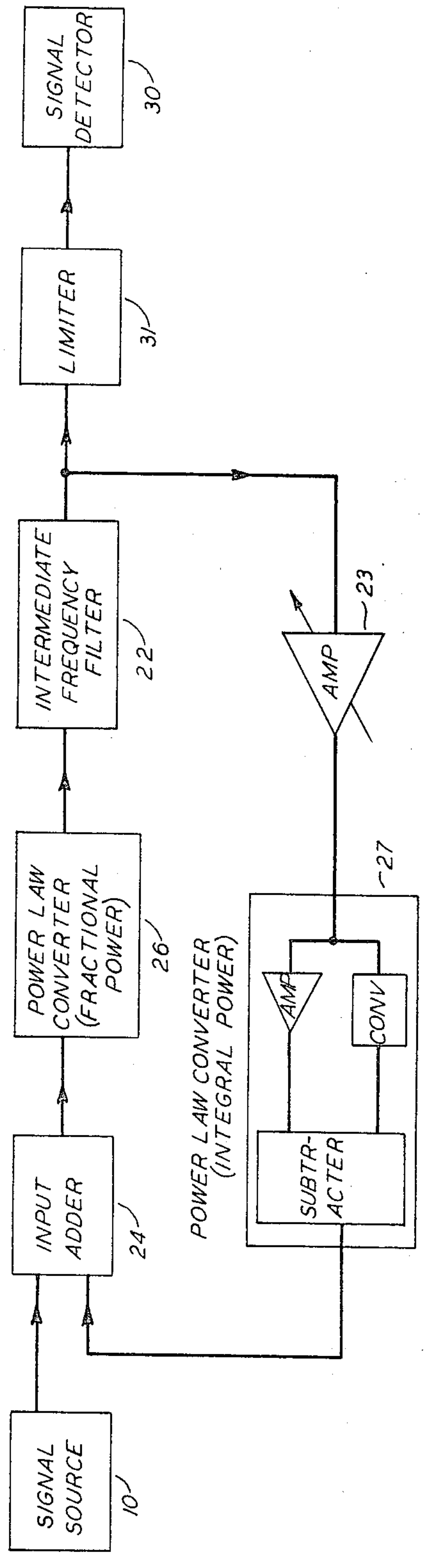
FIG. 3 is a block diagram of a feedback demodulator employing power-law nonlinear devices in both the forward and feedback paths of a feedback loop.

Still another embodiment of the invention is shown in FIG. 3. In this embodiment a power-law converter 26 is included in the feedback path of the loop and an additional power-law converter 27 is positioned in the return path of the loop. The forward path converter 26 has a fractional power characteristic, while the return path 27 has an integral power characteristic. Appropriate characteristics for these converters are provided by function generators, as discussed previously.

For the embodiment of FIG. 3, it will be assumed that an incoming frequency modulated wave is to have its modulation index reduced by a factor of 5. In that event the forward path converter 26 has a fifth-root characteristic and the return path converter 27 provides a third-order power-series expansion of the return path signal. The specific relationship among the various parameters associated with the components of the system in FIG. 3 is determined by the fifth-order trigonometric identity given in Equation 5:

$$\cos 5\theta + 20 \cos^3 \theta - 5 \cos \theta = 16 \cos^5 \theta \quad (5)$$

When the relationships of Equation 5 are satisfied, the outgoing wave is represented by $16^{1/5} \cos \theta$. Since this wave is also applied to the return path, it is normalized by the amplifier 23, which is accordingly provided with a gain setting of $16^{-1/5}$.

The power-law converter 27 converts the normalized output of the amplifier 23 according to the trigonometric expression $20 \cos^3 \theta - 5 \cos \theta$. This is accomplished by subtracting the output of an internal third power converter from the magnitude adjusted output of the amplifier 23. Thus the incoming wave $\cos 5\theta$, when linearly combined by the input adder 24 with the output of the power-law converter 27, gives rise to an outgoing wave whose frequency deviation has been reduced by a factor of 5, as desired.

Other aspects and adaptations of the invention will occur to those skilled in the art.

What is claimed is:

1. Apparatus for reducing the index of a frequency modulated wave, which comprises
- an adder having two input terminals, a first one of which is energized by said wave, and an output terminal,
- a power-law converter connected to the output terminal of said adder,
- a filter connected to said converter,
- an amplifier interconnecting said filter with a second terminal of said adder,
- and a detector connected to said filter.

2. Apparatus as defined in claim 1 wherein said power-law converter comprises
- two junction diodes connected in back to back configuration to said filter with respect to a ground of said apparatus,
- and a current source interconnecting the output terminal of said adder with the point of connection of said diodes to said filter.

3. Apparatus as defined in claim 1 further including means for starting said apparatus interconnecting the first terminal of said adder with said filter.

4. Apparatus as defined in claim 3 further including means, connected to the second terminal of said adder for disengaging the starting means at the end of a starting interval.

5. In a system for demodulating angularly modulated signals, means for reducing the angular deviation of an angularly modulated wave which comprises, a loop network connected between a source of modulated signals and a signal detector, said loop network including; a forward portion and a return portion, adder means supplied with signals from said source and with signals from said loop network, amplifier means located in the return portion of said loop network, and a serial combination of intermediate frequency filter means and power-law signal converter means.

6. In a system for demodulating angularly modulated waves, means for reducing the angular deviation of an angularly modulated wave, as defined in claim 5, wherein said power-law signal converter means is included in the return portion of said loop network and exhibits a power characteristic greater than unity.

7. In a system for demodulating angularly modulated waves, means for reducing the angular deviation of an angularly modulated wave, as defined in claim 5, wherein said power-law signal converter means is located in the forward portion of said loop network and exhibits a power characteristic less than unity.

8. In a system for demodulating angularly modulated waves, means for reducing the angular deviation of an angularly modulated wave as defined in claim 5 wherein said power-law signal converter means includes a first power-law signal converter located in the return portion of said loop which exhibits a power characteristic greater than unity and a second power-law signal converter located in the forward portion of said loop which exhibits a power characteristic less than unity.

9. Apparatus for demodulating a carrier wave that has been angle modulated by a modulating signal which comprises, adder network means supplied at a first input with a modulated carrier wave, power-law signal converter means supplied with signals from said adder, intermediate frequency filter means supplied with signals from said converter means, amplifier means for supplying signals from said intermediate frequency filter means to a second input of said adder network means, and means responsive to signals from said intermediate frequency filter means for recovering the modulating signal from said carrier wave.

10. A feedback demodulator which comprises, in combination, a source of carrier wave signals that have been angle modulated by a modulating signal, means for recovering said modulating signal from said carrier wave, and a feedback network located between said source and said recovery means, said feedback network including an adder network supplied at a first of its inputs with said modulated carrier wave signals and supplied at a second of its inputs with signals from the return portion of said feedback network, said feedback network further including power-law signal converter means and amplifier means serially connected.

References Cited

UNITED STATES PATENTS

| | | | |
|---|---|---|---|
| 2,344,678 | 3/1944 | Crosby | 325—351 |
| 2,379,721 | 7/1945 | Koch | 325—351 |
| 2,687,476 | 8/1954 | Guanella | 325—351 XR |

KATHLEEN H. CLAFFY, *Primary Examiner.*

R. S. BELL, *Assistant Examiner.*